J. DILL.
Apparatus for Stacking Hay, &c.
No. 214,284. Patented April 15, 1879.
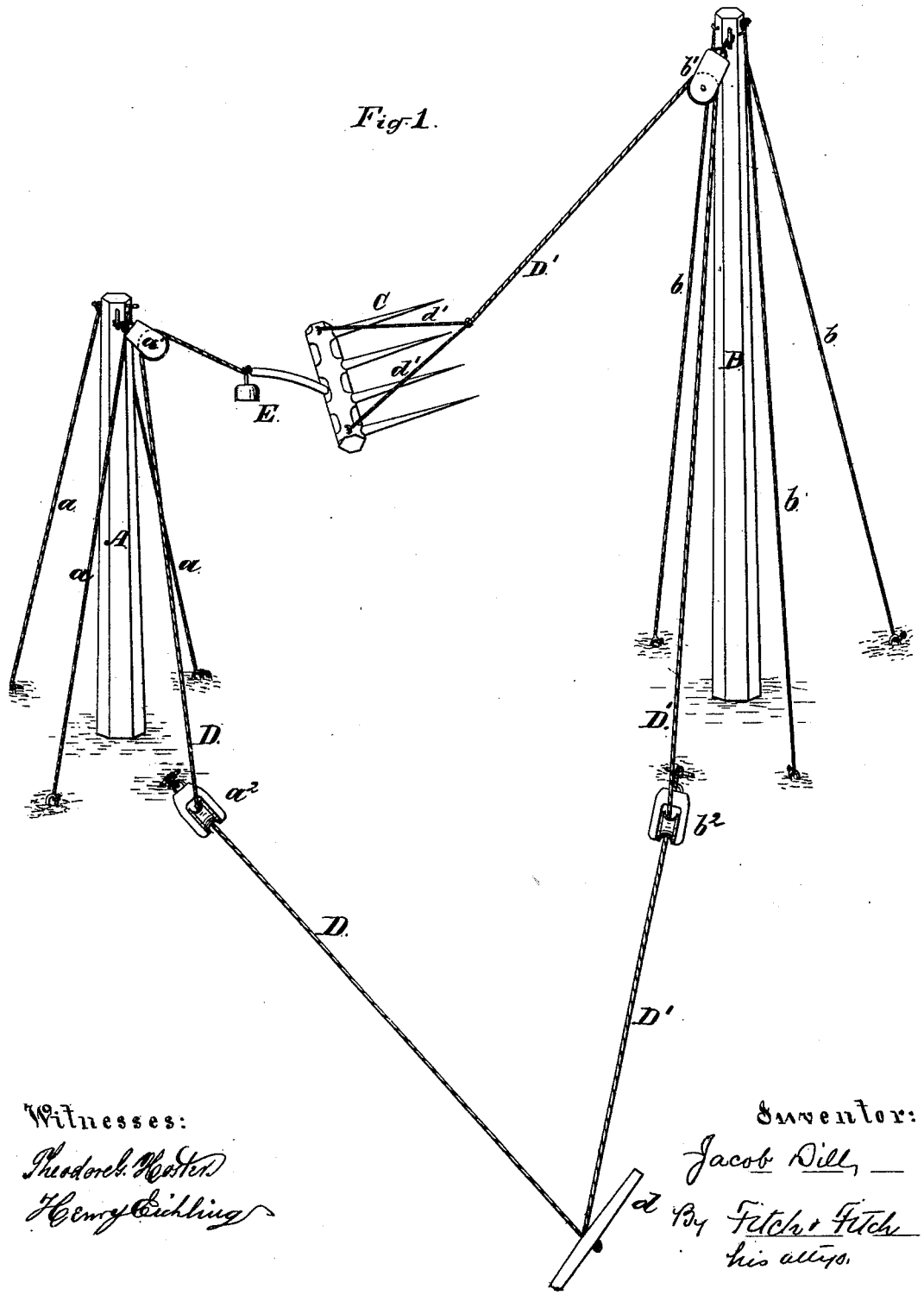

ID="main"
UNITED STATES PATENT OFFICE.

JACOB DILL, OF HUNTINGTON, INDIANA.

IMPROVEMENT IN APPARATUS FOR STACKING HAY, &c.

Specification forming part of Letters Patent No. 214,284, dated April 15, 1879; application filed March 5, 1879.

*To all whom it may concern:*

Be it known that I, JACOB DILL, of Huntington, county of Huntington, State of Indiana, have invented an Improved Apparatus for Stacking Hay, Straw, &c., of which the following is a full, clear, and exact description, reference being had to the accompanying drawing, forming part of this specification.

My invention relates to an apparatus for moving straw, hay, &c., from one place, such as a thrashing-machine, to a greater or less distance, and there depositing it in a stack, and in which the motive power may be supplied by a single horse, thus doing away with the labor of several men; and my invention consists in the combination of parts hereinafter described, and more particularly recited in the claim.

The figure shows my improved apparatus for stacking hay, straw, &c., in perspective view.

A is a post or pole which is seated in the ground and braced by the cords or rods $a$, as shown, to sustain the post, and prevent the post from yielding to a strain or weight imposed upon it sidewise at its top. This post should be seated at the place or point from which it is desired to take and convey the hay or straw to be packed. When used in connection with a thrashing-machine, the post A should be set at the "tail" of the machine. Near the top of the post A is rigged a block, $a^1$, and near its foot anchored in the ground is another block, $a^2$.

B is a second post. This is seated in the ground at any desired distance from the post A where it is desired to build the stack. It should be of a height somewhat greater than the desired height of the stack. It is braced by the cords or rods $b$, and has near its top the block $b^1$, and near its foot, anchored in the ground, the block $b^2$.

C is the fork for carrying the hay, &c. This is formed, as shown, with long teeth and with a short rearwardly-projecting handle. To the fork-handle is secured a rope or cord, D, which is passed through the blocks $a^1$ and $a^2$ of the post A, and thence to a whiffletree, $d$. To the cross-beam of the fork, by means of the lines $d'$, is secured the rope or cord D', which is passed through the blocks $b^1$ and $b^2$ of the post B, and thence to the whiffletree $d$. The handle of the fork is provided with a weight, E, which serves to counterbalance the weight of hay, &c., borne on the tines of the fork, and maintain the fork in a horizontal position while it is passing loaded from A to B.

The operation of my apparatus is as follows: A horse attached to the whiffletree is caused to travel away from the post A and somewhat toward the post B until the fork is brought to the post A. The fork is then loaded, and the horse is turned about and caused to travel away from the post B and somewhat in the direction of A. This causes the loaded fork to be drawn from A to B by the cords D and D'. When it reaches B the fork is unloaded, and its burden deposited at or near B. This operation is continued until the stack is formed at or near B. The apparatus may then be easily removed to a place where it is desired to build another stack. It is evident that all pitching of the hay or straw by men is thus avoided, and a horse may do the entire labor.

Having thus described my invention, what I claim as new, and desire to secure by Letters Patent, is—

In combination, the post A, with its braces $a$ and blocks $a^1$ and $a^2$, the post B, with its braces $b$ and blocks $b^1$ and $b^2$, the fork C, weight E, and cords D and D', all arranged to operate as and for the purpose specified.

JACOB DILL.

Witnesses:
 ALEX. H. STAUB,
 G. C. WHEELER.